Patented July 29, 1924.

1,502,945

UNITED STATES PATENT OFFICE.

CARLETON ELLIS, OF MONTCLAIR, NEW JERSEY.

PROCESS OF MAKING COLLOIDAL BODIES.

No Drawing. Application filed April 3, 1922. Serial No. 549,309.

*To all whom it may concern:*

Be it known that I, CARLETON ELLIS, a citizen of the United States, and a resident of Montclair, in the county of Essex and State of New Jersey, have invented certain new and useful Improvements in Processes of Making Colloidal Bodies, of which the following is a specification.

This invention relates to a reaction between ketones and aldehydes and to the products of such reaction, and specifically to acetone or lower ketones of the fatty series and related products with formaldehyde, paraform, hexamethylenetetramine and similar bodies, the reaction being carried out in the presence of a specific activating agent or orienting catalyzer exerting a directing or controlling influence on the character of the reaction.

The object of the invention is to produce colloidal or amorphous substances of a consistency ranging from syrupy and jelly-like materials to a substance of rubbery consistency and to hard solid resinous products intended for use in various plastic arts as for example the molding of various articles under heat and pressure such as insulation and other shaped objects, films, impregnating purposes, varnishes, lacquers, cements, heat-resisting bodies, beads, umbrella handles, cigarette holders, pipe stems, substitutes for amber, for employment in pyroxylin plastics and various other applications.

Acetone and formaldehyde react in the presence of alkaline reagents to form various compounds some of which have a peculiar susceptibility to undergo further reactions when exposed to heat under certain conditions. The character of the product obtained depends on the particular alkali employed, on the time of reaction and the temperature, dilution, etc.

The caustic alkalis, caustic potash and soda, and to a less extent barium hydrate, cause a rather violent reaction between acetone and formaldehyde, and the caustic alkalis potash and soda tend to from a highly colored resin of a reddish or brownish color, which is too dark for many purposes. Also the action of these alkalis is somewhat difficult to control and the reaction may progress rapidly through various stages without the possibiltiy of readily checking the reaction at any desired point.

For various purposes therefore milder alkalis such as sodium or potassium carbonate and the like are better adapted. The primary action of these alkalis is to form an initial condensation product which thickens to a syrup of pronounced viscosity but is soluble in water. Further action causes the syrup to become insoluble in water while still being more or less soluble in alcohol. Still further action destroys both the solubility in water and in various organic solvents, and finally a solid resin is formed which may be dark red in color but if care is taken in the operation a lighter colored resinous body may be produced. Sodium and potassium carbonate like the caustic alkalis tend however very strongly to the production of an off-colored resin.

Such resins are not objectionable for use in molding compounds which are to be black, brown or various shades of dark colors but do not serve for making white molding compounds or those in which delicately tinted shades are required.

Trisodium phosphate is better adapted for the purpose giving much lighter colored syrups, liquid resins and solid resins. However the action here is one which if permitted to progress too far will tend to yield discolored products. I may add that I have succeeded in producing water-white syrupy products by means of extremely dilute caustic potash or soda and that in all these operations the amount of alkali employed has a profound effect upon the nature of the resulting product. Thus while such extremely dilute caustic alkali solutions may be used they do not as a rule afford as desirable a yield as where larger amounts of a milder alkaline activator is used. Disodium phosphate has a noteworthy protecting influence, or inhibitive effect on the production of red dyestuff or coloring matter, permitting the production of water-white transparent syrups, liquid oils, solid resins and rubbery compounds by the primary activating effect of caustic soda or caustic potash. For example if disodium phosphate is added to a mixture of acetone and paraform no pronounced reaction occurs on heating but on adding caustic alkali a violent reaction will set in with the formation of a water-white compound ranging from a syrup to an infusible resin depending upon the proportions employed etc.

It may be unnecessary for me to call attention here to the endeavors which have been made for many years to obtain transparent resins of a water-white color similar in appearance to a good quality of glass. So far as I know such a product has never before been achieved from cheap and readily obtainable materials. The present invention enables the production of resins of this character resembling high quality glass when hard and transparent, and when opaque being of a milky to ivory color. Transparent resins are best produced from materials from which water has been largely eliminated.

Some of these bodies in a certain stage of formation have a rubbery feel and a mass of the material when squeezed shows a pronounced degree of elasticity.

By carrying out the reaction under well controlled conditions I may thus prepare products which range from water-soluble syrups to alcohol-soluble liquid bodies insoluble in water, alcohol-insoluble solid resins insoluble in water, resins which are insoluble in water and in various other organic solvents and resins which are infusible. Furthermore I may prepare various gelatinous bodies of varying degrees of solubility in water, alcohol and other solvents, in some cases being entirely insoluble in all common solvents and in other cases being infusible or only very slightly softened by heating, the softening not being in the nature of melting so much as an increase in rubbery and elastic qualities. These peculiar rubbery or elastic products which preferably but not necessarily are water-white transparent substances form a part of the present invention.

Molding compounds made up with white fillers such as zinc oxide with perhaps an addition of cotton linters or other white fibrous substance may be used for molding white articles which for many purposes are far more desirable and attractive than the black or brown or other dark colored products commonly prepared.

The following will serve to illustrate various products made in accordance with the present invention. The proportions given in the following examples being by weight.

*Example 1.*—10 parts acetone and 10 parts paraform were mixed, and 1 part of disodium phosphate $Na_2HPO_4 12H_2O$ dissolved in the least possible amount of water was added and stirred, followed by $\frac{1}{4}$ of a part caustic potash dissolved in an equal weight of water. On warming this mixture with stirring, reaction took place and the source of heat was removed, the reaction progressed with ebullition and a water-white syrup was produced.

*Example 2.*—8 parts acetone, 10 parts paraform and 1 part dry disodium phosphate were mixed, $\frac{1}{2}$ of a part of caustic soda dissolved in its own weight of water was added. On heating, reaction took place and a clear almost water-white jelly was produced which was not tacky. It was quite tough and elastic.

*Example 3.*—8 parts acetone and 12 parts paraform were mixed with 1 part of disodium phosphate, dissolved in the least amount of water possible, and $\frac{3}{4}$ part of caustic soda, dissolved in a small amount of water, added. After reaction was over the composition was heated and yielded a white jelly.

Without the sodium phosphate the action of the caustic potash alone is to produce a resinous product red in color and tending to be opaque rather than transparent. The inhibitive effect on color formation brought about by the presence of the sodium phosphate is very striking.

*Example 4.*—On adding to a syrupy product such as that obtained in Example 1 a small amount of aqueous caustic soda and heating, reaction takes place with the formation of a tough white or ivory colored solid resin. For example to 20 c.c. of the syrup I added 4 drops of a 50% solution of caustic potash, stirred well and heated, then after reaction started I withdrew the test tube from the flame and shortly the syrup solidified increasing in volume as it did so, due to gases which were disengaged and expelling a long tube-like mass of vesiculated resin out of the test tube. This was very firm but rubbery and on cooling stiffened somewhat but still was slightly flexible; its color was almost white, slightly cream color. When a portion of this rubbery substance was heated on hot plate it charred without fusing.

*Example 5.*—By carrying the reaction only to the point where a water-soluble syrup is obtained and removing any caustic alkali catalyst, introducing in its place carbonate of soda, the reaction may be caused to progress very gradually yielding a liquid oil and finally a solid resin. Thus the transition from the water-soluble syrup to an infusible resin may be carried out in degrees to give products of graduated solubility, hardness, elasticity, brittleness, etc.

*Example 6.*—10 parts each acetone and paraform, $\frac{1}{2}$ part sodium phosphate and $\frac{1}{2}$ part caustic potash. The sodium phosphate was added as a dry powder but the caustic potash was dissolved in about an equal amount of water. This was well heated to start the reaction going vigorously and the mixture quickly solidified to a white porous translucent mass having a spongy elastic feel, and when squeezed resuming its original shape after release of pressure. A product of this sort I choose to term "rubber-like acetone compound" as it is much more like rubber in its properties than like resin in its properties.

As the term "resin" has been used herein somewhat indiscriminately I desire to make clear that I consider the white transparent elastic substance to be distinct from a resin in its properties, in fact not a resin but a colloid more like rubber or nitrocellulose in certain properties. While a strong alkali such as caustic soda used in moderate amount gives a brittle resinous product the colloidal syrup produced with alkaline phosphate bodies on gradual heating becomes transformed into the elastic insoluble infusible colloid quite distinct in its properties from a brittle resin.

An example of the formation of an oil or water-insoluble product is as follows:

*Example 7.*—100 parts acetone, 250 parts 37% aqueous formaldehyde and 25 parts sodium carbonate were boiled under reflux condenser for several hours and a red oil gradually separated at the bottom. This was drawn off from time to time to avoid its further transformation. Somewhat over 170 parts of the reddish oil were obtained. It was soluble in alcohol and was nearly neutral. The alkali was present in the aqueous liquor. The oil was freed from traces of the aqueous liquor and was then ready to be mixed with wood flour or other filler, together with a suitable amount of alkaline catalyst, then dried and molded. As wood flour absorbs some alkali and as caustic alkali is preferable as a catalyst for rapid molding the amount of catalyst added should be properly proportioned as is best determined by test. One to three per cent on the weight of the oil is usually adequate.

What I claim is:—

1. The process of making products from ketones and aldehydes having physical properties of a widely differing character which comprises reacting on acetone with formaldehyde in the presence of a mild alkali which acts as an orienting catalyst whereby bodies ranging from water-soluble syrups, alcohol-soluble liquid resins, alcohol-soluble solid resins, insoluble resins, infusible resins and insoluble gelatinized products are obtained at will.

2. The process of making a colloid which comprises reacting on acetone and formaldehyde in the presence of disodium phosphate and caustic soda such reaction being continued to form a white transparent jelly.

3. The process of making a colloid which comprises reacting on acetone and paraform in the presence of disodium phosphate and caustic soda such reaction being continued to form a white transparent syrup.

4. The process of making a colloid which comprises reacting on acetone and paraform in the presence of disodium phosphate and caustic soda such reaction being continued to form a white transparent solid.

5. A white transparent syrup condensed from acetone and formaldehyde in the presence of a phosphate said syrup being substantially insoluble in water but soluble in alcohol.

6. A white transparent syrup produced by reaction between acetone and formaldehyde and being substantially insoluble in alcohol.

7. A white transparent rubbery substance produced by reacting on acetone with formaldehyde.

8. A white transparent jelly produced by reacting on acetone with formaldehyde.

9. An infusible resin of white to ivory color produced by reacting on acetone with formaldehyde.

10. A process of making a white transparent jelly, which comprises reacting on acetone with formaldehyde in the presence of an alkaline phosphate.

CARLETON ELLIS.